Figure 1:
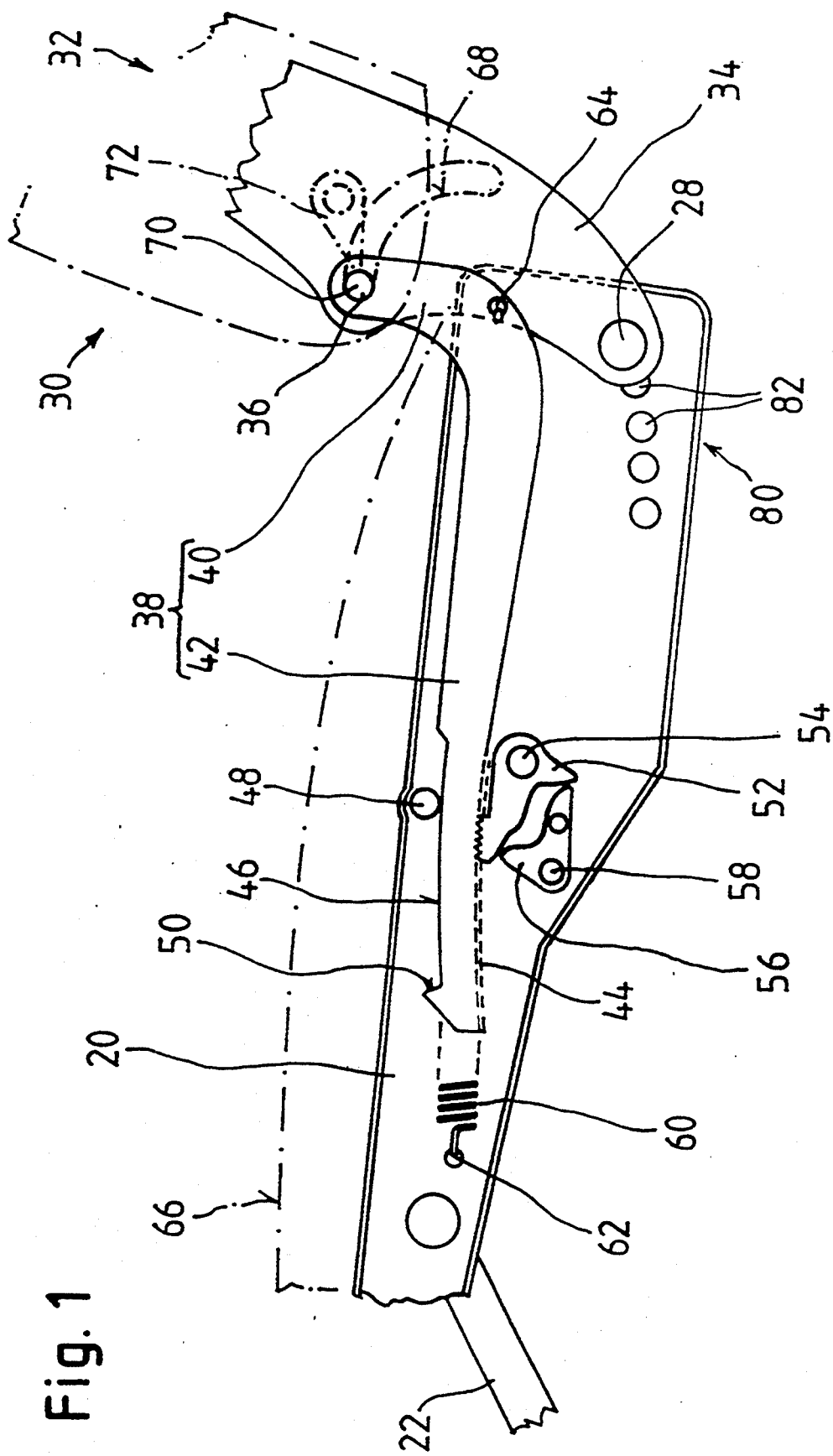

United States Patent [19]

Bauer et al.

[11] Patent Number: 5,421,640
[45] Date of Patent: Jun. 6, 1995

[54] BACK-REST HINGE FOR A VEHICLE SEAT WITH A SEAT SUPPORT AND A BACK-REST HINGED TO IT

[75] Inventors: Heinz Bauer; Burckhard Becker; Ernst-Reiner Frohnhaus, all of Solingen, Germany

[73] Assignee: C. Rob. Hammerstein GmbH, Germany

[21] Appl. No.: 183,663

[22] Filed: Jan. 19, 1994

[30] Foreign Application Priority Data

Jan. 23, 1993 [DE] Germany .................. 43 01 811.4

[51] Int. Cl.⁶ .................................................. B60N 2/22
[52] U.S. Cl. ................................. 297/372; 297/370; 297/367; 297/383
[58] Field of Search ............... 297/366, 367, 368, 369, 297/370, 371, 383, 372

[56] References Cited

U.S. PATENT DOCUMENTS

| | | | |
|---|---|---|---|
| 298,065 | 5/1884 | Bush, Jr. ................ | 297/370 X |
| 1,821,298 | 9/1931 | Ferreira ................... | 297/370 |
| 2,066,630 | 1/1937 | Leader et al. ............ | 297/370 |
| 2,158,453 | 5/1939 | Wood ....................... | 297/372 |
| 3,133,764 | 5/1964 | Naef ........................ | 297/367 |
| 4,634,182 | 1/1987 | Tanaka .................... | 297/367 X |

FOREIGN PATENT DOCUMENTS 647598  6/1937  Germany ............... 297/367

*Primary Examiner*—Peter R. Brown
*Attorney, Agent, or Firm*—Eckert Seamans Cherin & Mellott

[57] ABSTRACT

A back-rest hinge for a vehicle seat that has a seat support and a back-rest. The back-rest hinge has a swivel joint operatively interconnecting the seat support and the back-rest for variable inclination of the back-rest relative to the seat support. A locking mechanism permits adjusting an angle of inclination of the back-rest in relation to the seat support. A locking lever is hinged to the back-rest at a hinge point spaced from the swivel joint along a lengthwise direction of the back-rest. The locking lever has a locking portion which extends from the hinge point in a direction of the seat support that intersects a front edge of this seat support. The locking mechanism includes an interlock mechanism on the seat support, which interacts with the locking portion, and an activation device. The interlock mechanism is positionable between one position in which it is cooperatively engaged with the locking portion and another position in which it is disengaged from the locking portion. The activation device can releasably retain the interlock mechanism in the one position. The back-rest hinge further has an adjustment device disposed between the swivel joint and one of the back-rest and the seat support. This adjustment device has a direction of adjustment that essentially extends in parallel to the previously-mentioned direction of the seat support.

8 Claims, 2 Drawing Sheets

BACK-REST HINGE FOR A VEHICLE SEAT WITH A SEAT SUPPORT AND A BACK-REST HINGED TO IT

The invention relates to a back-rest hinge for a vehicle seat with a seat support and a back-rest, which is hinged to this support by means of a swivel joint, and a locking device for adjusting the angle of inclination of the back-rest in relation to the seat support, with a locking lever being hinged to the back-rest at a hinge point, the hinge point being at a distance, the locking lever having a locking area extending in the direction of the seat support and toward a front edge of this seat support, and an interlock means being provided on the seat support, which interacts with the locking area, can be released, and is normally in mesh, and with which an activating member is associated.

The back-rest hinge of this type previously known from DE rather via the locking lever, which acts on the back-rest support at a distance from the swivel joint, and which is locked far in front of the swivel joint (looking toward the front edge of the seat). In this way the locking device and thus also the control of the back-rest hinge can be located roughly in the middle of the longitudinal dimension of the vehicle seat. Consequently it is located at a sufficient distance from other adjustment devices, for example those for the height of the rear edge of the seat, for the adjustment of a head-rest, etc. Besides, the locking forces are favourably channelled into the seat support.

The particular advantage lies, however, in the fact that the lever arms used for locking the back-rest are relatively long, in any case considerably longer than in the prior art. Thus it is possible to obtain a considerably stiffer locking action with the same consumption of material. In practice, this means that material can be used more economically. Moreover, the back-rest hinge according to the invention is relatively simple in construction; it requires relatively few parts, which are moreover simple to produce; for example, they may be punched parts.

The locking area may be constructed in any way desired; for example, it may be constructed as a toothed rack or a threaded rack, or having notches or notched openings, e.g. like the ones known for the longitudinal-adjustment devices of vehicle seats.

In the case of a vehicle seat with such a back-rest hinge there further arises the object of being able to alter the usable seating surface area of the seating part, while maintaining the advantages of the back-rest hinge of the type initially mentioned.

Vehicle seats with a device for adjusting and altering the usable seating surface area of the seating part are in themselves known. In the case of this vehicle seat with seating-depth and back-rest adjustment a bearing component is provided between an angularly adjustable hinged bracket mounted on the seat support and the back-rest. The bearing part is guided by a crank or a connecting link guide. In the case of a vehicle seat previously known, a rail guide is provided between the back-rest and the seat support.

The object is achieved by the swivel joint being connected to the seat support via an adjustment device and the operational direction of this adjustment device extending for the main part parallel to the seat support.

Thus according to the invention the back-rest is not hinged directly to the seat support, but rather is connected to it via the adjustment device, allowing the hinge point of the back-rest to be adjusted essentially in a horizontal direction in relation to the seat support. In this way the seating depth, i.e. the space available on the vehicle seat for accommodation of the thighs of a user, is altered. According to the invention a parallel adjustment of the back-rest can be obtained by activation of both the locking lever and said adjustment device. Other adjustment paths, for example a lowering of the back-rest in the case of the seating depth being adjusted to a minimum and a raising of the back-rest in the case of maximum seating depth, can be obtained by corresponding construction of the operational direction of the adjustment device.

Altogether the invention allows better adaption of a vehicle seat to the individual requirements of a user than in the prior art, while maintaining the advantages of the back-rest hinge according to the parent application. The adjustment device can be mounted in such a way as to be unseen and to economize space, power-operated actuation is possible. In the case of manual activation the associated activation device can be provided at various positions, in particular directly beneath the back-rest.

The adjustment device may be constructed in a number of ways, its construction is also influenced by the desired operational direction of the adjustment device. In a simple construction of the adjustment device an identical row of punched holes is provided on both sides of the seat support, every hole in the row being suitable for the entry of a detachable shaft. The back-rest can be adjusted to different swivel points with a transfer of the shaft.

In another embodiment a toothed segment is lockably fastened to the seat support, which bears the shaft for the back-rest at a distance from its own swivel point. If the swivel point of this toothed member is essentially located above and in front of the shaft, a space-saving embodiment is obtained, reference here being made to the mid position of the toothed member.

Finally arrangements with toothed rack and pinion as well as jackscrew actuator and spindle nut are possible, the shaft for the back-rest in these cases being provided on the pinion or on the spindle nut respectively. These embodiments are also especially suitable for power-driven adjustment.

In a preferred further development of the invention the distance between the back-rest shaft connected to the seat support via the adjustment device according to the invention and the hinge point of the locking lever is several centimeters, particularly five and preferably ten centimeters, and in principle is chosen so as to be as large as possible, thus giving favourable leverage for the locking of the back-rest.

Furthermore, in advantageous further development the length of the toothed area and, accordingly, the length of the bearing surface is amply chosen so as to allow adjustment of the back-rest in all positions of the adjustment device of the back-rest shaft by means of the locking lever 38 within a given angle of adjustment. The same should also hold when the locking lever is lockable via a different locking device, for example an arrangement consisting of spindle and nut, a toothed rack with pinion, etc.

If an adjustment device for the back-rest shaft is provided on both sides of the seat support, it is advantageous that a transfer mechanism be provided so as to transfer a manual or power-driven adjustment made on one side to the other side of the seat.

Further advantages and features of the invention arise from the remaining claims and from the following description of embodiments not to be interpreted as restrictive, which are shown in detail with reference to the drawing. The drawing shows in FIG. 1 side view of a seat support to which a back-rest is hinged and which has an adjustment device for the shaft of this back-rest and FIG. 2 an illustration corresponding to FIG. 1 however with a different construction of the adjustment device.

FIG. 1 shows a seat support 20, which is supported in well-known manner by a frontal arm 22 and a rear arm (not depicted) at each of its two sides. In practical operation each of the arms is connected to a seat rail of a longitudinal guide well-known in itself. A back-rest 30 is hinged onto the seat support 20 to swivel around a shaft 28, its bearing element is a rest support 32. Its construction is well known in itself, only the lower region of one of the two vertical supports 34 is shown in the figure. In its bottom part this support is hinged to shaft 28. Thus shaft 28 forms the swivel joint of the back-rest.

For accommodating shaft 28, which is embodied as a removable linchpin, several identically formed holes 82 are provided on both sides of the seat support 20. This arrangement forms an adjustment device 80. The holes 82 are arranged in a curve descending towards the front edge of the seat. Altogether five such holes 82 are provided. If shaft 28 is put into the foremost hole 82 (on both sides of the seat support 20) the shortest possible seating depth of the seat surface, i.e. of an upholstery 66, is obtained; if however shaft 28 is, as depicted, in the hindmost pair of holes 82 the maximum seating depth is obtained. The other holes 82 allow intermediate settings.

This shown embodiment can be simplified for practical implementation for example by the five holes 82 being interconnected via a narrower elongated hole and shaft 28 having a local flattening or thinning, which fits through the elongated hole. In practical operation shaft 28 is drawn out a certain way in its lengthwise direction until the thin region is within the elongated hole, within which it can then be displaced from one hole 82 to the next, etc. Shaft 28 can also be embodied in the form of two short stub axles, which are spring-loaded and snap into the holes 82 and can be withdrawn from the holes 82 by a tool working in opposite direction to the spring.

A hinge point 36 for a locking lever 38 is formed on support 34, displaced from the swivel joint in the direction of the back-rest 30, i.e. displaced toward the upper edge of the back-rest. As the figure shows, this hinge point is located in the frontal edge region of support 34. In other words, in the normal, slightly reclining, operating position of the back-rest 30, hinge point 36 is essentially above the swivel joint formed by shaft 28.

Locking lever 38 is L-shaped. It consists of a shorter section which extends essentially in the direction of the back-rest 30, the section extending here too, as shown in the figure, essentially vertically, while the back-rest is adjusted to a slightly reclining position, and a longer section which extends essentially in the direction of the seat support 20. For simplicity the first section will subsequently be referred to as vertical shank 40 and the second section will be referred to as horizontal shank 42. This refers literally to the embodiment shown; other embodiments are possible. Thus, the locking lever 38 may in principle also be almost straight, also the hinge point 36 may be located vertically below the swivel joint when the back-rest 30 is in its normal (slightly reclining) position. Finally, the locking lever 38 may also consist of several parts (see below).

As shown in the figure, the horizontal shank 42 is considerably longer than the vertical shank 40. In the embodiment, the ratio between them is between 3 and 4 to 1. The vertical shank 40 is shorter than the distance between hinge point 36 and the swivel joint. In the concrete embodiment shown, the distance between swivel joint and hinge point 36 is approx. 9 cm; the length of the vertical shank 40 is about 6 cm. By contrast, the total length of the horizontal shank 42 is about 24 cm. The hinge point 36 is located above the seat support 20 in the normal operating position of the back-rest 30. If the back-rest 30 is adjusted to be reclined as far as possible within the permissible range of adjustment, the hinge point 36 is located roughly at a height that lies along the extension of the upper edge of the seat support 20.

A toothed area 44 is provided on the free end section of the horizontal shank 42, which amounts to about one third of its total length. The teeth point downward, i.e. toward the longitudinal guide (not depicted). Opposite the toothed area 44 a bearing surface 46 is formed on the horizontal shank 42. A bolt mounted to the seat support 20 sits on the bearing surface to form a supportive bearing 48. The bearing surface 46 is bounded on both sides by a pair of stopping faces 50 protruding perpendicularly to its direction. The horizontal shank 42 has constant dimensions between the bearing surface 46 and the toothed area 44, in particular a constant height.

In the locked position which is depicted, a locking lever 52 is in mesh with the toothed area 44; the locking lever has a toothing corresponding to the toothed area 44, with several teeth, for example five to seven. It is hinged to the seat support 20 swivelling around a shaft 54. An activation lever 56 is associated with it, which is likewise hinged to the seat support 20 swivelling around a shaft 58; however, shaft 58 extends transversely through to the other side of the seat support, thereby connecting the two activation levers 56 on the respective sides of the seat in a rigid joint stiff against torsion. The activation lever 56 is essentially V-shaped in the concrete embodiment shown; it has two detent lugs. In the locked position shown, these lugs rest on two detent flanks of the locking lever 52. However, if the activation lever 56 is turned counterclockwise, it no longer blocks the locking lever 52 and the latter can be released, as will be shown in detail later on. In the concrete constructive design shown, a swivelling of the back-rest is possible within a swivel angle of 55°

The length of the toothed area 44 and correspondingly the length of the bearing surface 46 are chosen in such a way that the back-rest 30 is adjustable within a predetermined angular range independent of the position of shaft 28.

The design of the locking components, especially the locking lever 52 and the activation lever 56, is in itself open to choice, and well known from the state of the art for other types of locking mechanisms. Instead of a locking lever 52, a pinion can also be employed. Likewise, a pinwheel adjustment device is possible.

As the figure shows, of the several teeth of the locking lever 52, the one located more or less directly opposite the supportive bearing 48 is the one closest to the vertical shank 40. Also, the shaft 54 is located closer to the vertical shank 40 than are the teeth of the locking lever 52. Furthermore, a spring 60 is provided, pre-stressing the back-rest 30 in a forward direction, i.e. counter-clockwise in the figure. The left-hand terminal section of the spring 60 is hooked into the seat support at 62; its right-hand terminal section in the figure acts on the lower end of the vertical shank 40 at 62. Thus, in the specific embodiment shown, the spring extends essentially parallel to the horizontal shank 42, but is longer than the latter. Because of the arrangement chosen, it pre-stresses the blocked locking lever 38 in a clockwise turning direction. In other words, the bearing surface 46 is pressed against the supportive bearing 48 by the spring 60. The back-rest hinge is rendered rattleproof by the spring 60.

If the locking lever 52 is released via the activation lever 56 as described above, the spring 60 pulls the locking lever 38 toward the point of engagement 62. This brings about a counter-clockwise turning motion of the locking lever 52, whose toothing is thus released from the toothed area 44 of the horizontal shank 42.

The dash-dotted lines in the figure indicate the outline of an upholstery 68. It will be seen that the outline of the upholstery 68 is always in front of (viewed in seating direction) or above the locking lever 38.

Finally, in the figure a dash-dotted line also indicates a rapid adjustment mechanism of the back-rest 30. This rapid adjustment is an advantageous further development; however, its provision is not mandatory.

For rapid adjustment, a bow-shaped curved wing 68 is provided in the support 34 of the back-rest support 32. In the concrete embodiment shown it is shaped like a circle segment and has a centre that is located above the swivel joint roughly in the middle between hinge point 36 and swivel joint. Basically, the wing 68 can also be embodied as a circle segment having the swivel joint as its centre. In that case, the possible angle of the rapid adjustment is smaller than the one in the embodiment shown; however, the locking lever 38 remains at rest during the rapid adjustment. By contrast, the locking lever 38 moves during the rapid adjustment in the embodiment shown; the locking device described above permits a certain amount of tipping movement within the locked position.

For rapid adjustment of the back-rest, the two hinge points 36 of the two locking levers 38 are attached to each other rigidly and stiff against torsion by means of a shaft extending transversely; this shaft 70 grips the wing 68 and thus a section of the shaft constitutes the wing piece. In the normal position which is depicted in the figure, the shaft 70 is secured by means of a blocking member 72 in such a way that it lies in the upper end position of the wing 68. In the embodiment shown, the rapid adjustment serves to quickly tip forward the back-rest 30, a familiar process that is used, for example, for getting into the back seat of a two-door vehicle.

The blocking member 72 has a swivel shaft which is located on the support 34 and displaced in a V-shape at an acute angle to the course of the wing 68. By means of an activation device not depicted in the figure, for example by means of a Bowden wire, the blocking member 72 can be pulled upwards from the blocking position shown; in the process it is swivelled clockwise. Consequently, its detent lug, which rests on the shaft 70 in the position shown, releases the shaft 70; thus the shaft can be moved within the wing 68.

As the locking of the back-rest hinge according to the invention occurs essentially in the middle of the seat support 20, the locking forces are favourably (in the sense of a latticework) channelled into the frame-shaped seat support 20. When the locking forces are channelled into the vicinity of the swivel joint (the shaft 28), the channelling of the forces is less favourable and to obtain the same rigidity, the seat support 20 must be made more solid than according to the invention.

In its movements, the horizontal shank 42 of the locking lever 38 remains within the side walls of the seat support 20; thus it requires no additional space to move. As the figure shows, the adjustment mechanism 26 for the rear arm 24 is located between the swivel joint (shaft 28) and the locking device of the locking lever 38.

The curvature of the toothed area 44, and thus also of the bearing surface 46, has been chosen so that the locked part of the toothed area retains the orientation that is depicted, independently of the angle to which the back-rest is adjusted. Instead of a curved embodiment, the locking lever 38 may also have two parts; e.g. a straight rack or a threaded rack may be hinged to the endpoint of the reference line for the horizontal shaft.

Figure 2:
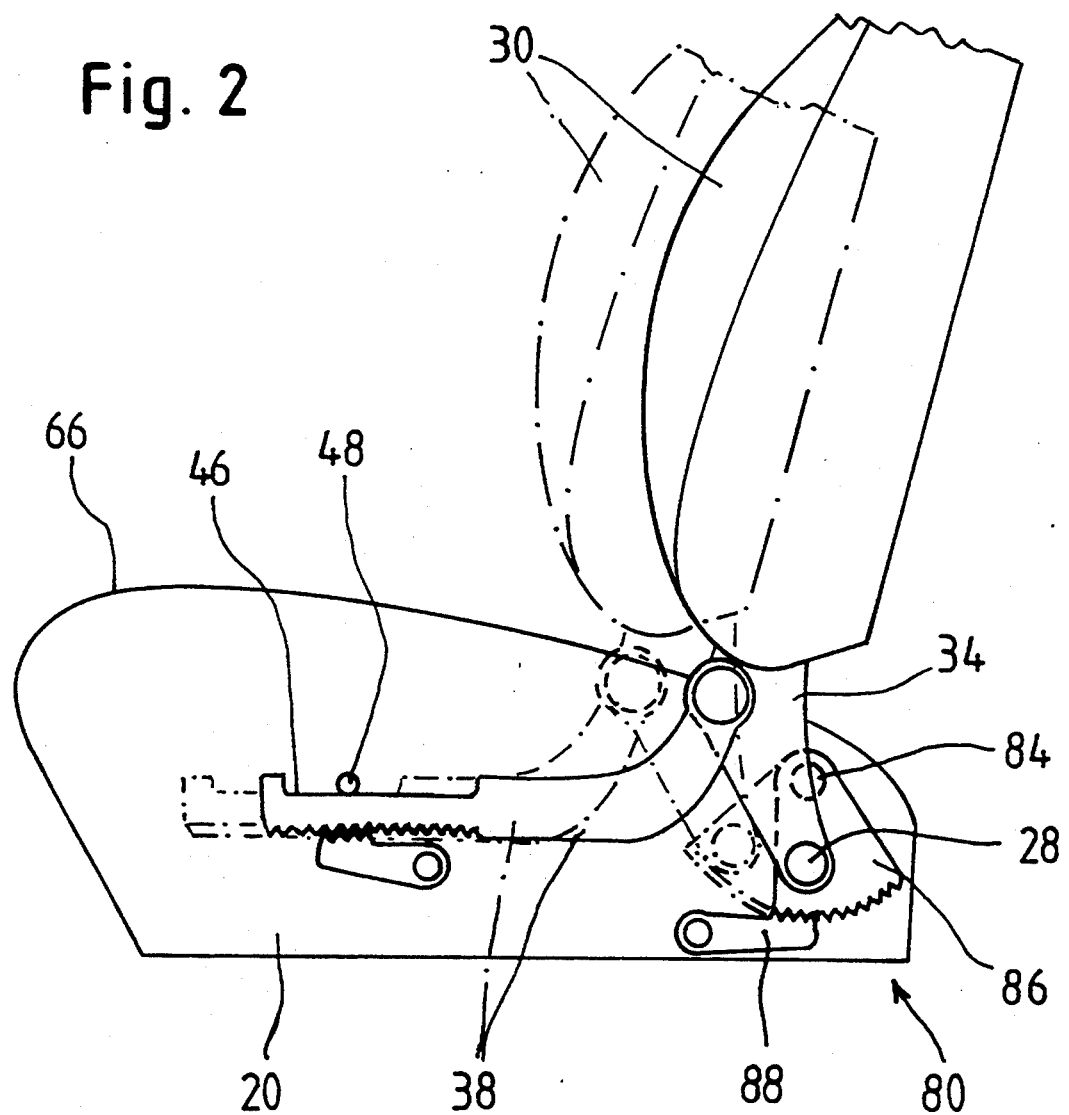

FIG. 2 shows another construction of the adjustment device 80. A toothed segment 86, which extends over a segment of the arc of about 30°, is hinged to the seat support 20 in a swivel joint 84. Off-centre and as close as possible to the teeth, the back-rest 30 is hinged to the toothed segment via shaft 28, which is formed as a stub axle. The teeth are associated with a locking component 88, which can be activated by an activation device not shown. When released, the toothed segment 86 can swivel forwards from the depicted rear end position within a given swivel range, whereby shaft 28 moves along the dash-dotted curve; the front end position is shown with dash-dots. Joint 84 is embodied as a shaft joining both sides of the seat support, so that the adjusting movement occurs on both sides simultaneously.

In the depicted right-hand end position of the toothed segment 86, joint 84 is essentially located vertically above shaft 28 in the embodiment shown in FIG. 2. Thus the back-rest is raised to the foremost end position of the toothed segment 86 according to the dash-dotted curve. However, if joint 84 is located further towards the front edge of the seat, an operating direction of the adjustment device 80 is obtained, which raises the back-rest when the seating surface is enlarged.

We claim:
1. Back-rest hinge for a vehicle seat that has a seat support and a back-rest, the back-rest hinge comprising:
a swivel joint operatively interconnecting the seat support and the back-rest for variable inclination of the back-rest relative to the seat support,
a locking mechanism for adjusting an angle of inclination of the back-rest in relation to the seat support,
a locking lever being hinged to the back-rest at a hinge point spaced from the swivel joint along a lengthwise direction of the back-rest, the locking lever having a locking portion which extends from the hinge point in a direction of the seat support that intersects a front edge of this seat support,
the locking mechanism including an interlock means on the seat support, which interacts with the locking portion, and an activation device, wherein the interlock means is positionable between one position in which it is cooperatively engaged with the locking portion and another position in which it is disengaged from the locking portion, and wherein the activation device releasably retains the interlock means in said one position, and, an adjustment device disposed between the swivel joint and one of the back-rest and the seat support, this adjustment device having a direction of adjustment that essentially extends in parallel to said direction of the seat support.

2. Back-rest hinge according to claim 1, wherein the hinge point is located closer to an upper edge of the back-rest than the swivel joint.

3. Back-rest hinge according to claim 1, wherein the locking portion comprises a toothed area along one of a lower and upper side thereof, said back-rest hinge further comprising a supportive bearing on the seat support, and the locking portion having a bearing surface on the side opposite to the toothed area, the toothed area having a length and the bearing surface having a length such that the respective lengths are selected such that the back-rest is adjustable through a given angular range in all positions of the adjustment device.

4. Back-rest hinge according to claim 1, wherein the direction of adjustment of the adjustment device also has a vertical component.

5. Back-rest hinge according to claim 4, wherein the direction of adjustment of the adjustment device defines a curved path.

6. Back-rest hinge according to claim 1, wherein the adjustment device includes several holes arranged alongside each other.

7. Back-rest hinge according to claim 1, wherein the adjustment device includes a toothed segment, which is hinged to the seat support to swivel around a joint, which accommodates the swivel joint of the back-rest, and with which a locking component is associated.

8. Back-rest hinge according to claim 7, wherein said joint associated with the seat support is located above the swivel joint of the back-rest when the adjustment device is in a mid-position.

* * * * *

UNITED STATES PATENT AND TRADEMARK OFFICE
CERTIFICATE OF CORRECTION

PATENT NO. : 5,421,640
DATED : June 6, 1995
INVENTOR(S) : Heinz Bauer et al.

It is certified that error appears in the above-indentified patent and that said Letters Patent is hereby corrected as shown below:

Column 1, lines 19-20, delete "The back rest hinge of this type previously known from DE" and insert therefor -- In the case of the back rest hinge mentioned initially, locking does not occur at the swivel joint itself, but --.

Column 1, line 27, delete "is,located" and insert therefor -- is located --.

Signed and Sealed this

Twelfth Day of December, 1995

BRUCE LEHMAN

*Commissioner of Patents and Trademarks*